Figure 1:
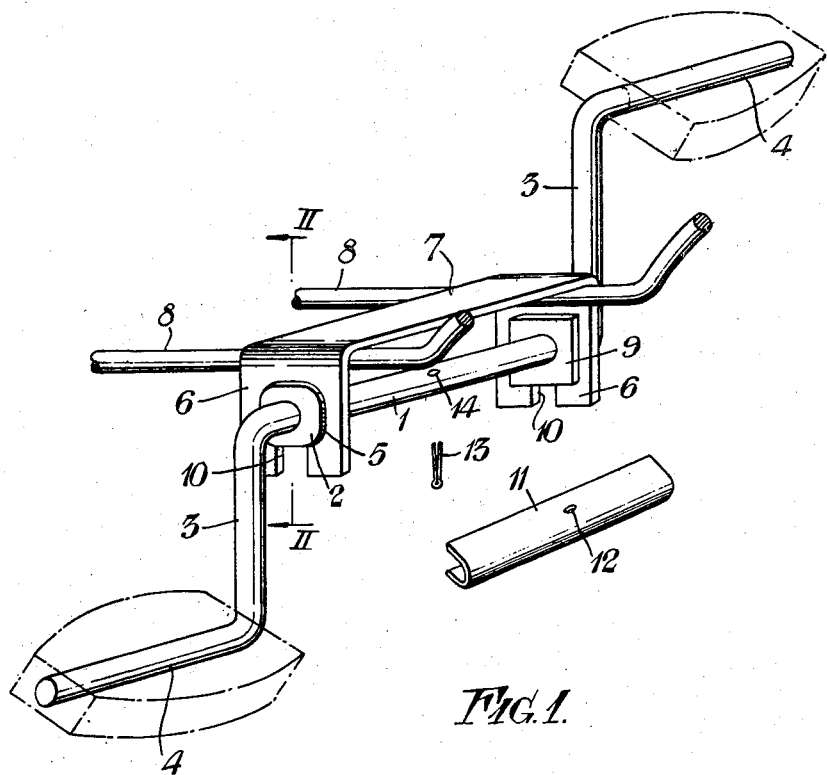

July 7, 1953          H. SEBEL          2,644,345

CRANK MECHANISM

Filed Feb. 28, 1951

INVENTOR
Harry Sebel

BY George W. Cooley

ATTORNEY

Patented July 7, 1953

2,644,345

UNITED STATES PATENT OFFICE 2,644,345

CRANK MECHANISM

Harry Sebel, London, England

Application February 28, 1951, Serial No. 213,270
In Great Britain December 28, 1950

7 Claims. (Cl. 74—594.1)

1

The present invention relates to crank mechanisms, more particularly though not exclusively to crank mechanisms for bicycles and other pedal propelled vehicles, and has for an object to provide an improved construction of a crank mechanism in which a double ended crank member is formed in one piece and is rotatably secured in a support by means of providing for its ready and easy removal therefrom.

According to the invention the crank mechanism comprises a double ended crank member and bearing means adapted to be removably carried in a support for rotatably supporting said crank member, and bearing retaining means detachably secured to said crank member and engaging the bearing means for positioning said bearing means in said support.

According to a further feature of the invention, the crank member is formed from a length of rod or tube of circular cross section which is bent to the desired shape to form the cranks after journal blocks formed in one piece and having a bore to receive the length of rod or tubing have been slid onto the rod or tubing.

Conveniently the support may comprise a U-shaped member the legs of which are apertured to receive the journal blocks which are preferably substantially rectangular in shape and are formed with a flange which engages the inner face of the leg of the U-shaped member to position the block within the aperture. A further U-shaped member or spacer embraces the portion of the crank member between the blocks and is removably secured thereto, as for example by means of a split pin extending through the spacer and through an aperture in the crank member. The spacer bears at each end against the journal blocks and is of such a length as to maintain the blocks positioned in the apertures with the flanges of the blocks in engagement with the inner faces of the legs of the U-shaped support. A slot extends from the free end of each leg of the support to the aperture therein and is of sufficient width to permit the crank member to pass freely therealong but insufficient to permit passage of the journal block.

It will be apparent that with the spacer in position on the crank member the blocks will be firmly held in the apertures in the support with their flanges against the legs of the support, while upon removal of the spacer the blocks can be slid inwardly of the support out of the apertures and the crank member may be removed through the slots leading from the apertures to the ends of the supporting legs.

2

Figure 2:
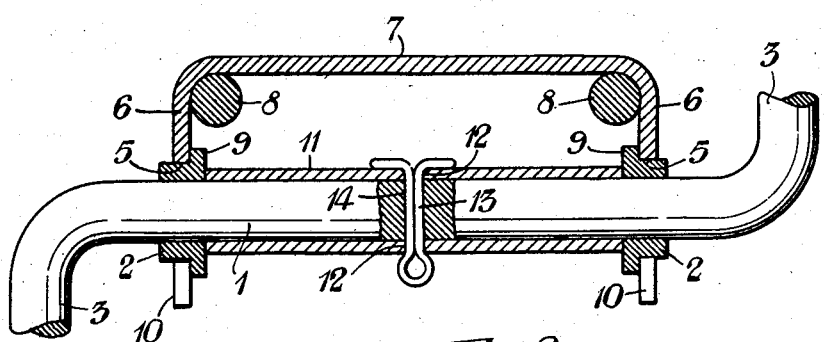

The invention will now be described with reference to the accompanying drawing illustrating one embodiment of the invention as applied to a bicycle, such as for instance that described in my co-pending application Serial No. 213,269, filed February 28, 1951. In the drawing:

Figure 1 is a perspective view of the crank member assembled in the supporting bracket, the spacer being shown removed in order to show details of construction; and Figure 2 is a section taken along the line II—II of Figure 1, the spacer being shown in the assembled position.

As will be seen from the drawing, a crank member 1 is journalled in the two one piece blocks 2 and is formed at each end with a crank portion 3 and pedal supporting portion 4, the crank portions being diametrically opposed.

The crank member, crank portions and pedal supporting portions are formed from a single length of metal rod bent to the desired shape after the blocks 2 have been fitted thereon.

The blocks 2 are of substantially square shape and are adapted to seat in square shaped apertures 5 in the downwardly extending legs 6 of a U-shaped support 7 secured, as by welding for example, to members 8 forming part of the frame of the bicycle.

The blocks 2 are formed with flange portions 9 adapted to engage the inner surfaces of the legs 6 when the blocks are seated in the apertures, and slots 10 extend from the apertures to the lower end of the legs 6. The slots 10 are of a width such that the crank member 1 may pass freely through but are of less than the width of the blocks, so that by moving the blocks 2 inwardly with respect to the legs 6 along the axis out of the apertures 5, the crank member can be removed from the support through the slots 10.

In order to maintain the crank mechanism in the assembled position, the blocks 2 are held in position in the apertures 5 by means of a U-shaped spacer 11 which embraces the crank member 1 and is of a length such as to engage the flanged portions 9 and maintain them in engagement with the legs 6. The spacer is apertured as at 12 to receive a split pin 13 adapted to pass through an aperture 14 in the crank member 1, whereby the spacer is removably secured to the crank member and positions the crank member lengthwise of the axis thereof with respect to the legs 6. To remove the crank member from the support it is only necessary to remove the split pin 13 and the spacer 11 when the blocks 2 can be slid inwardly along the crank member to enable it to be removed through the slots 10.

In an alternative construction, the blocks are held in position by a pair of split pins removably secured in the crank member 1 and each adapted to bear against a corresponding block. Preferably a washer is interposed between each split pin and the corresponding block.

There is thus provided a crank mechanism which is easily and readily assembled or disassembled and requiring a reduced number of parts. It is especially suitable for use in children's toys such as bicycles, tricycles, motor cars, etc. in which the toy is propelled by means of pedals, because of its simplicity and ease of manufacture.

What I claim is:

1. A crank mechanism comprising a support, a bearing removably carried by said support, a crank member supported in said bearing for rotation thereof on the crank axis and provided with cranks disposed thereon in spaced relation along said axis at opposite sides of said bearing, and bearing retaining means detachably mounted on said crank member and engaging said removable bearing to retain said bearing in crank member supporting position in said support, and upon detaching said bearing retaining means from said crank member releasing said bearing for removal from said support so as to provide for removal of the crank member from said support.

2. A crank mechanism as defined in claim 1 in which said bearing retaining means cooperates with said crank member to position said crank member in operating position with respect to said support.

3. A crank mechanism comprising a support, a pair of bearing blocks carried by said support in spaced relation along the crank axis and so as to be removable from said support upon movement of the respective blocks along said axis, a crank member supported in said bearing blocks for rotation thereof on said axis and provided with cranks disposed thereon in spaced relation along said axis with said blocks between said cranks, and bearing retaining means detachably mounted on said crank member between said blocks and engaging said blocks to retain said blocks in their respective crank member supporting positions in said support and upon detaching said bearing retaining means from said crank member releasing said blocks for said movement thereof along said axis so as to provide for removal of said crank member from said support.

4. A crank mechanism as defined in claim 3 in which said support provides two legs spaced apart along said crank axis, said legs being provided with apertures formed to receive the respective bearing blocks inserted therein upon movement of said blocks along said axis, said legs respectively being provided with slots extending from said apertures to the free ends of said legs and of a width with respect to the width of said apertures to permit the crank member to pass along said slots when the respective blocks are removed from said apertures while preventing passage of said blocks along said slots.

5. A crank mechanism as defined in claim 4 in which said bearing blocks respectively are provided with flanges adapted to engage respective surfaces of said legs that are disposed transverse to the crank axis when said blocks are in crank member supporting position in said apertures, said bearing retaining means being adapted to engage said blocks to maintain said flanges respectively in engagement with said surfaces of said legs.

6. A crank mechanism as defined in claim 3 in which said bearing retaining means comprises an elongated channel member disposed along said crank axis and adapted to embrace a portion of said crank member lying between said bearing blocks, said channel member being detachably secured to said crank member and bearing at its ends against said bearing blocks to retain said blocks against movement thereof along the axis.

7. In a bicycle, tricycle, toy motor car or like wheeled vehicle, the combination with the frame of the vehicle, of a support supported by said frame, a bearing removably carried by said support, a crank member supported in said bearing for rotation thereof on the crank axis and provided with cranks disposed thereon in spaced relation along said axis at opposite sides of said bearing, and bearing retaining means detachably mounted on said crank member and engaging said removable bearing to retain said bearing in crank member supporting position in said support and upon detaching said bearing retaining means from said crank member releasing said bearing for removal from said support so as to provide for removal of the crank member from said support and from said frame.

HARRY SEBEL.

References Cited in the file of this patent

UNITED STATES PATENTS

| Number | Name | Date |
|---|---|---|
| 710,245 | Brooks | Sept. 30, 1902 |
| 1,600,453 | Corcoran | Sept. 21, 1926 |

FOREIGN PATENTS

| Number | Country | Date |
|---|---|---|
| 41,504 | Sweden | Sept. 3, 1915 |